(12) United States Patent
Vedanabhatla et al.

(10) Patent No.: US 8,125,906 B2
(45) Date of Patent: Feb. 28, 2012

(54) CAPTURE RCDT AND SNTT SAS SPEED NEGOTIATION DECODES IN A NETWORK DIAGNOSTIC COMPONENT

(76) Inventors: Kiranmai Vedanabhatla, San Jose, CA (US); Geoffrey T. Hibbert, San Jose, CA (US); Steven R. Klotz, Austin, TX (US)

( * ) Notice: Subject to any disclaimer, the term of this patent is extended or adjusted under 35 U.S.C. 154(b) by 418 days.

(21) Appl. No.: 11/675,041

(22) Filed: Feb. 14, 2007

(65) Prior Publication Data
US 2007/0206509 A1   Sep. 6, 2007

Related U.S. Application Data

(60) Provisional application No. 60/779,040, filed on Mar. 3, 2006.

(51) Int. Cl.
*G01R 31/08* (2006.01)
*H04J 3/16* (2006.01)
(52) U.S. Cl. ......... 370/232; 370/241; 370/252; 370/465
(58) Field of Classification Search .......... 370/241–253, 370/464–471
See application file for complete search history.

(56) References Cited

U.S. PATENT DOCUMENTS

| | | | |
|---|---|---|---|
| 5,304,990 A | | 4/1994 | Rebourg et al. |
| 5,850,388 A | | 12/1998 | Anderson et al. |
| 5,946,301 A | * | 8/1999 | Swanson et al. ............... 370/252 |
| 6,011,778 A | * | 1/2000 | Kilkki et al. .................. 370/232 |
| 6,128,715 A | | 10/2000 | Wang et al. |
| 6,205,190 B1 | | 3/2001 | Antonio et al. |
| 6,268,808 B1 | | 7/2001 | Iryami et al. |
| 6,385,297 B2 | | 5/2002 | Faulkner et al. |
| 6,429,811 B1 | | 8/2002 | Zhao et al. |
| 6,510,156 B1 | | 1/2003 | Brock et al. |
| 6,526,362 B2 | | 2/2003 | Jones et al. |
| 6,618,360 B1 | * | 9/2003 | Scoville et al. ............... 370/248 |

(Continued)

FOREIGN PATENT DOCUMENTS

CN   200780010952   9/2010

(Continued)

OTHER PUBLICATIONS

Penokie, George, Alternate SAS Speed Negotiation State Diagram, Oct. 10, 2002, T10/02-405 Rev. 0, T10 Committee (SCSI).*

(Continued)

*Primary Examiner* — Huy Vu
*Assistant Examiner* — Brandon Renner
(74) *Attorney, Agent, or Firm* — Matthew A. Pequignot; Pequinot + Myers LLC

(57) ABSTRACT

Systems and methods for a network diagnostic device or component that is placed in-line between two nodes in a network to capture the value of a component of a speed negotiation signal. The network diagnostic component receives a speed negotiation signal from a first node for communication with a second node. The speed negotiation signal may be received by a receive module. The speed negotiation signal includes one at least a first portion that comprises one or more data units. The network diagnostic component measures the duration of the data units of the first component of the speed negotiation data. This measurement may be performed by a measurement module. The network diagnostic component compares the measured duration with a desired duration. The comparison may be performed by a measurement module. A record of whether the measured duration compares with the desired duration is then generated by a generation module.

21 Claims, 3 Drawing Sheets

U.S. PATENT DOCUMENTS

| | | |
|---|---|---|
| 6,687,641 B2 | 2/2004 | Jones |
| 6,715,105 B1 | 3/2004 | Rearick |
| 6,868,495 B1 | 3/2005 | Glover |
| 7,103,050 B1 * | 9/2006 | Luijten et al. ............ 370/395.21 |
| 7,200,170 B1 * | 4/2007 | Desandoli et al. ............ 375/224 |
| 7,281,167 B2 | 10/2007 | Dube |
| 7,539,489 B1 * | 5/2009 | Alexander .................... 455/423 |
| 7,599,293 B1 | 10/2009 | Bain et al. |
| 2001/0039580 A1 | 11/2001 | Walker et al. |
| 2002/0064255 A1 * | 5/2002 | Mohammadian et al. ...... 379/21 |
| 2002/0112044 A1 | 8/2002 | Hessmer et al. |
| 2002/0163932 A1 * | 11/2002 | Fischer et al. ................ 370/465 |
| 2003/0028509 A1 | 2/2003 | Sah et al. |
| 2003/0033397 A1 | 2/2003 | Gurumoorthy et al. |
| 2003/0081125 A1 | 5/2003 | Sheldon et al. |
| 2003/0142629 A1 * | 7/2003 | Krishnamurthi et al. ..... 370/249 |
| 2003/0212694 A1 | 11/2003 | Potapov et al. |
| 2003/0224797 A1 | 12/2003 | Kuan et al. |
| 2004/0006574 A1 | 1/2004 | Witkowski et al. |
| 2004/0049596 A1 | 3/2004 | Schueler |
| 2004/0054776 A1 | 3/2004 | Klotz et al. |
| 2004/0057389 A1 | 3/2004 | Klotz et al. |
| 2004/0170383 A1 | 9/2004 | Mazur |
| 2004/0208501 A1 | 10/2004 | Saunders et al. |
| 2004/0215421 A1 | 10/2004 | Schmitz et al. |
| 2004/0225729 A1 | 11/2004 | Sabiers et al. |
| 2005/0060402 A1 | 3/2005 | Oyadomari et al. |
| 2005/0071445 A1 | 3/2005 | Siorek et al. |
| 2006/0061369 A1 * | 3/2006 | Marks et al. .................. 324/542 |
| 2006/0095630 A1 | 5/2006 | Bashford et al. |
| 2006/0117189 A1 | 6/2006 | Chiu et al. |
| 2006/0153177 A1 | 7/2006 | Worrall et al. |
| 2006/0168207 A1 | 7/2006 | Choong et al. |
| 2006/0224822 A1 | 10/2006 | Blomquist et al. |
| 2006/0233111 A1 * | 10/2006 | Wright .......................... 370/241 |
| 2007/0061681 A1 | 3/2007 | Carmichael |
| 2007/0299999 A1 * | 12/2007 | Duerk et al. ................... 710/105 |
| 2008/0052586 A1 | 2/2008 | Rajski et al. |

FOREIGN PATENT DOCUMENTS

| | | |
|---|---|---|
| EP | 07757009.1 | 8/2010 |
| WO | WO 01/01272 | 1/2001 |
| WO | WO 02/087124 | 10/2002 |
| WO | PCT/US07/062162 | 6/2008 |

OTHER PUBLICATIONS

Elliott, Rob, Serial Attached SCSI Phy Layer, Sep. 30, 2003, HP Industry Standard Servers, SCSI Trade Association.*
U.S. Appl. No. 12/061,356, filed Apr. 2, 2008, Kotturu et al.
U.S. Appl. No. 11/675,046, filed Feb. 14, 2007, Milne et al.
U.S. Appl. No. 11/675,045, filed Feb. 14, 2007, Vedanabhatla et al.
U.S. Appl. No. 11/675,036, filed Feb. 14, 2007, Gentieu et al.
Working Draft American National Standard, Serial Attcahed SCSI-1.1 (SAS-1.1)' Specification, Revision Mar. 4, 2004.
Compression and Decompressing Data Using Java APIs' by Mahmoud et al., Feb. 2002.
LeCroy's 'SASTracker' Datasheet, copyright 2006.
LeCroy's 'SAS InFusion and SATA in Fusion Error Injector and Traffic Modifier' Datasheet, copyright 2005.
U.S. Appl. No. 11/675,046, Mar. 19, 2010, Final Office Action.
U.S. Appl. No. 11/675,046, Jul. 7, 2009, Office Action.
U.S. Appl. No. 11/675,045, Mar. 23, 2010, Final Office Action.
U.S. Appl. No. 11/675,045, Jul. 17, 2009, Office Action.
U.S. Appl. No. 11/675,045, Oct. 29, 2008, Office Action.
U.S. Appl. No. 11/675,036, Mar. 24, 2010, Final Office Action.
U.S. Appl. No. 11/675,036, Sep. 4, 2009, Office Action.
Dr. Thomas Porter: "The Perils of Deep Packet Inspection" SecurityFocus.com Jan. 11, 2005.
Sundaresan and Moussa, "Algorithms and programming models for efficient representation of XML for Internet", Computer Networks (2002).
U.S. Appl. No. 11/675,045, Jul. 27, 2010, Office Action.

* cited by examiner

CAPTURE RCDT AND SNTT SAS SPEED NEGOTIATION DECODES IN A NETWORK DIAGNOSTIC COMPONENT

CROSS-REFERENCE TO RELATED APPLICATIONS

This application claims the benefit of U.S. Provisional Application No. 60/779,040, filed Mar. 3, 2006, which is incorporated herein by reference in its entirety.

BACKGROUND

Computer and data communications networks continue to proliferate due to declining costs, increasing performance of computer and networking equipment, and increasing demand for communication bandwidth. Communications networks—including wide area networks ("WANs"), local area networks ("LANs"), metropolitan area networks ("MANs"), and storage area networks ("SANS")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET"), Serial Attached SCSI ("SAS"), Serial Advanced Technology Attachment ("SATA"), and InfiniBand networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind much of the advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across various networks such as Ethernet and SONET at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

BRIEF SUMMARY

Embodiments disclosed herein relate to a network diagnostic device or component that is placed in-line between two nodes in a network to capture the timing value of a portion of a speed negotiation signal. For example, the network diagnostic component receives a speed negotiation signal from a first node for communication with a second node. The speed negotiation signal may be received by a receive module. The speed negotiation signal includes at least a first portion that comprises one or more data units.

The network diagnostic component measures the duration of the data units of the first component of the speed negotiation data. This measurement may be performed by a measurement module.

The network diagnostic component compares the measured duration of the data units with a desired duration value. The comparison may be performed by a measurement module. A record of whether the measured duration of the data units compare with the desired duration values is then generated by a generation module.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The embodiments disclosed herein relate to a network diagnostic component or device that is placed in-line between a first and second node. The diagnostic component or device is used to capture the timing value of a component of a speed negotiation signal. For example, the first node may communicate with the second node using a speed negotiation signal that includes a first component comprising one or more data units. In some embodiments, the speed negotiation signal may be of the SAS protocol. The network diagnostic component may receive the speed negotiation data and measure the duration of the data units of the first component. The network diagnostic component may then compare the measured value with a desired duration value and generate a record of the comparison. In some embodiments a timestamp is affixed to the generated record. In other embodiments, the generated record is displayed on a display device.

The embodiments disclosed herein may be practiced in networking systems, including the testing of high speed data transmission systems and components. Embodiments described herein may also be used in other contexts unrelated to testing systems and components and/or unrelated to high speed data transmission. An example networking system will first be described. Then, the operation in accordance with specific embodiments disclosed herein will be described. Note that as used herein the terms "first", "second" and so forth are not intended to imply sequential ordering, but rather are intended to distinguish one element from another.

Example Networking System

Figure 1:
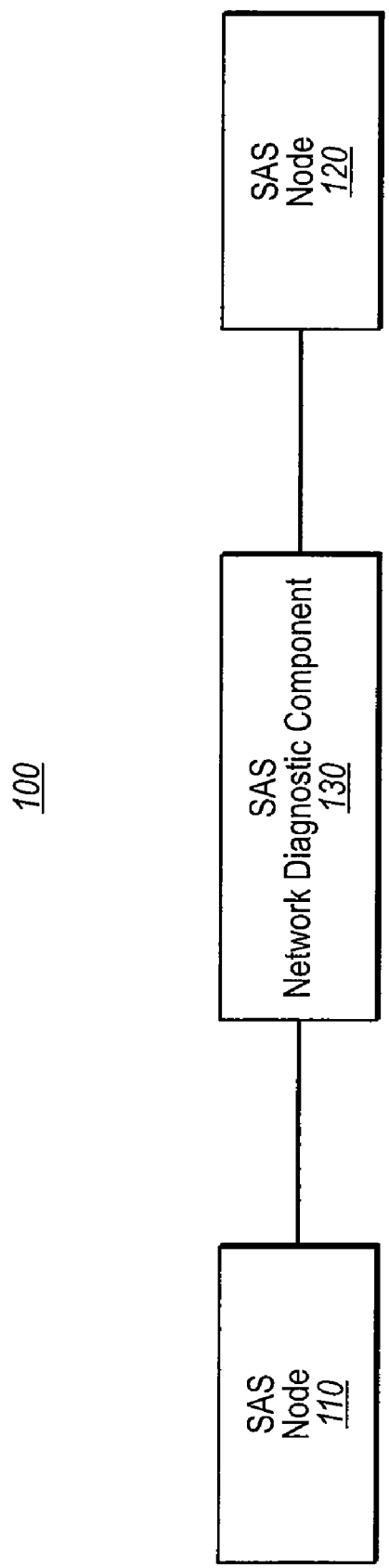
FIG. 1 illustrates a block diagram of a network including a network diagnostic component placed in-line between two nodes.

FIG. 1 is a block diagram of a networking system 100. The networking system 100 may include one or more nodes 110, 120, which communicate with each other via a network. As used herein, a "node" includes, but is not limited to, a server or host; a client or storage device; a switch; a hub; a router; all or a portion of a SAN fabric; a diagnostic device; and any other device or system, or combination thereof, that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" or "network data stream" includes, but is not limited to, a packet; a datagram; a frame; a data frame; a command frame; an ordered set; any unit of data capable of being routed (or otherwise transmitted) through a computer network; and the like. In one embodiment, a network message or data stream may comprise transmission characters used for data purposes, protocol management purposes, code violation errors, and the like.

Also, an ordered set may include, a Start of Frame ("SOF"), an End of Frame ("EOF"), an Idle, a Receiver_Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), Serial SCSI Architecture ("SSA"), and the like. In this description and in the claims, protocol is defined to mean at least the speed at which the nodes communicate and the communication rules that are used by the nodes when communicating.

As shown in FIG. 1, the nodes 110,120 are preferably SAS/SATA nodes. As used herein, "SAS/SATA nodes" includes nodes that are SAS compatible, nodes that are SATA compatible, and nodes that are both SAS compatible and SATA compatible. It will be appreciated, however, that the nodes 110,120 need not be SATA/SATA nodes and that the nodes 110,120 may be other types of nodes that are compatible with other types of network protocols. In addition, any reference to a node as being a host or initiator node and another node as being a target node is for illustration only. It is contemplated that nodes 110, 120 can be both host and target nodes as circumstances warrant.

The networking system 100 may comprise a network, network diagnostic system, a network testing system, or the like including network diagnostic components (such as network diagnostic component 130), which may be configured to communicate network messages among nodes. For example, the network diagnostic component 130 may be inserted between the nodes 110,120 such that network messages sent between the nodes 110,120 are available to network diagnostic component 130 and/or are routed through the network diagnostic component 130. As used herein, "in-line" denotes that a network diagnostic component is configured to have the network messages sent between two nodes routed to it so that the network messages are available to the network diagnostic component. In some embodiments the network diagnostic component may be directly in-line or it may be indirectly in-line through the use of a tap or like device. In still other embodiments, the network diagnostic component may have the network messages routed to it in any reasonable way.

In further detail, the network diagnostic component 130 may send and receive signals or data. Accordingly, using a signal, the network diagnostic component 130 may receive one or more network messages from a node, send one or more network messages to a node, or both. For example, the network diagnostic component 130 may receive one or more network messages sent between the nodes 110,120. The network diagnostic component 130 may also retransmit those network messages. In particular, the network diagnostic component 130 may receive network messages sent from the node 110 and then retransmit them to the node 120. Also, the network diagnostic component 130 may receive network messages sent from the node 120 and then retransmit them to the node 110.

Prior to retransmitting these network messages, the network diagnostic component 130 can modify the signal used to transmit the network messages. For example, the network diagnostic component 130 may digitally retime the signal, may modify the content of the messages themselves, or both.

It will be appreciated that the network diagnostic component 130 may modify the signal in other desired ways. Because it is not always desirable to have the network diagnostic component 130 modify the signal, the network diagnostic component 130 may be selectively configured to modify (or not to modify) the signal used to transmit the network messages.

The network diagnostic component 130 may also perform a variety of network diagnostic functions using network messages sent between the nodes 110,120. In performing some of these diagnostic functions, the network diagnostic component 130 may be configured to be passive to the network messages. If desired, the network diagnostic component 130 may receive at least some of the network messages, and may transmit some or all of the received traffic. In performing other diagnostic functions, the network diagnostic component 130 may be configured to modify some or all of the network traffic.

As shown in FIG. 1, the network diagnostic component 130 is preferably a SAS/SATA network diagnostic component. As used herein, "SAS/SATA network diagnostic components" includes network diagnostic components that are SAS compatible, network diagnostic components that are SATA compatible, and network diagnostic components that are both SAS compatible and SATA compatible. It will be appreciated, however, that the network diagnostic component 130 need not be a SAS/SATA network diagnostic component and that the network diagnostic component 130 may be another type of network diagnostic component that is compatible with other types of network protocols. In fact, the network diagnostic component 130 may be configured to perform its functions on any type of network and/or network topology using any number of network protocols.

SAS Speed Negotiation

The speed of communication in SAS links is often determined during a speed negotiation sequence. In SAS, for example, the speed negotiation sequence consists of different speed negotiation windows that often begin at the lowest possible speed and then continue to higher speeds. For example, during speed negotiation, SAS nodes generally try to communicate first at 1.5 Gigabits per second (Gbps), then 3 Gbps, then 6 Gbps, etc. Each speed negotiation window consists of transmission of D.C. idle (common mode voltage) for a certain length of time followed by transmission of speed negotiation data dwords for the remainder of the speed negotiation window time.

For example, in the SAS protocol, node 110 would first send a speed negotiation signal at 1.5 Gbps to node 120. If node 120 recognized the 1.5 Gbps speed negotiation signal, then node 110 would send a speed negotiation signal at 3 Gbps. If node 120 recognized the 3 Gbps speed negotiation signal, then node 110 would send a speed negotiation signal at 6 Gbps. This process would continue until either node 110 had reached its speed limit or there was a speed that node 120 did not recognize. In either case, the fastest speed supported by both nodes would be used.

RCDT and SNTT are special timers used in a SAS speed negotiation sequence. A SAS transmitter is typically supposed to send D.C. idle for a certain amount of time in between the different speed negotiation rates. The length of time for which the D.C. idle is transmitted between the different speed negotiation rates is called Rate Change Delay Time, abbreviated as RCDT. The value of RCDT is defined by the SAS protocol to be approximately 503 micro seconds.

Similarly, a SAS transmitter that supports a physical link rate is supposed to send speed negotiation data dwords for a defined period of time. A successful SAS speed negotiation window typically consists of ALIGN0 primitive dwords followed by ALIGN1 primitive dwords. The time during which the ALIGN0 and ALIGN1 primitive Dwords are transmitted during a successful speed negotiation window is called Speed Negotiation Transmit Time, abbreviated as SNTT. The value of SNTT is specified by the SAS protocol as approximately 110 microseconds.

Often during the speed negotiation sequence, it is desirable for a user of network diagnostic component 130 to view the values of the RCDT and SNTT speed negotiation timers. This would allow the user to ascertain if the speed negotiation sequence was properly being performed and to take corrective action if warranted. However, conventional network diagnostic devices do not allow a user to view the RCDT and SNTT values. The principles of the present invention provide for showing these values.

Capture RCDT and SNTT Decodes for SAS Speed Negotiation

Figure 2:
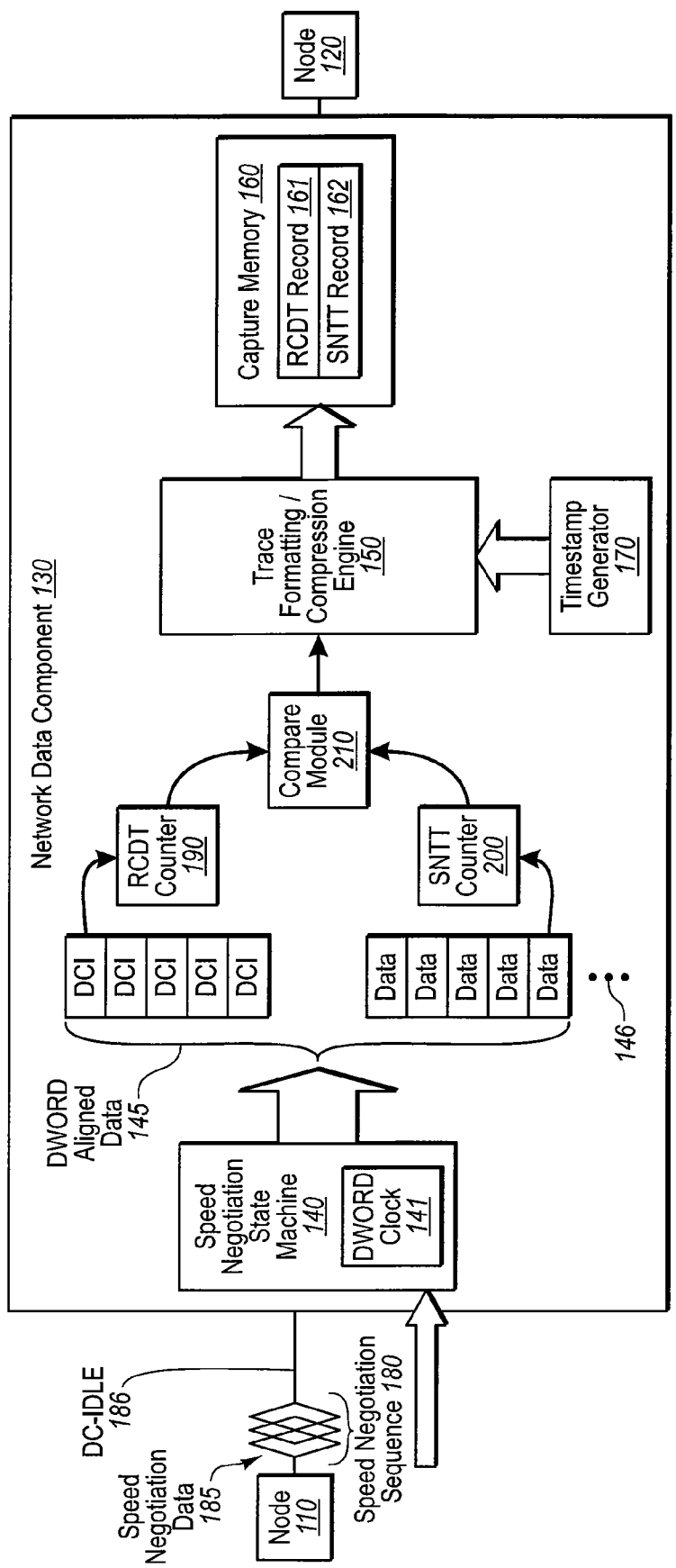
FIG. 2 illustrates a detailed view of a particular embodiment of the network diagnostic component of FIG. 1.

Referring to FIG. 2, a specific embodiment of network diagnostic component 130 is shown. FIG. 2 shows that network diagnostic component 130 includes a speed negotiation state machine 140, a capture memory 160, a timestamp generator 170, a trace formatting/compression engine 150, a RCDT counter 190, a SNTT counter 200 and a compare module 210. Components 190 and 200 are used to measure the RCDT and SNTT and verify that they are correct.

Trace formatting/compression engine 150 may be implemented as software, hardware, or any combination of software and hardware. In like manner, the RCDT and SNTT counters 190 and 200 and compare module 210 may also be implemented as software, hardware, or any combination of software and hardware. Note that embodiment of FIG. 2 is only one example of the countless ways that the components of network diagnostic component 130 may be laid out.

As illustrated, speed negotiation state machine 140 may be implemented as any reasonable state machine. The speed negotiation state machine 140 samples an incoming speed negotiation sequence 180 from the wire using an internal dword clock 141. The speed negotiation sequence 180 comprises speed negotiation D.C. idle stream 186 and speed negotiation data dwords 185.

Speed Negotiation state machine 140 then generates dword aligned data 145 that represents the D.C. idle (DCI) and the speed negotiation data dwords (DATA) detected from speed negotiation sequence 180. Note that dword aligned data 145 includes ellipses 146 following the DCI block and the data block. This is to illustrate that the D.C. idle and speed negotiation data portions of the speed negotiation sequence 180 are typically many dwords in size. Accordingly, the number of D.C. idle (DCI) and speed negotiation data dwords depicted is for illustration only and is not meant to imply a required number of dwords.

The DCI portions of dword aligned data 145 are then passed to the RCDT counter 190. The data portions of dword aligned data 145 are passed to the SNTT counter 200. The RCDT counter 190 and SNTT counter 200 are used to count the number of DCI and data dwords respectively. The output of both counters is provided to or otherwise made accessible to compare module 210, where the counted number is compared with a desired count number that equals the specified time of approximately 503 micro seconds for RCDT and 110 micro seconds for SNTT.

A record of the comparison and the total count of the D.C. idles is then created and stored in capture memory 160 by the trace formatting/compression engine 150 as illustrated by RCDT record 161. A timestamp generated by timestamp generator 170, which may be a counter in some embodiments, is affixed by trace formatting/compression engine 150 to the total count of D.C. idles and to the comparison and included in the RDCT record 161. The timestamp allows for the accurate recreation of the duration of the D.C. idles (and speed negotiation data as will be described) that occurred on the line.

As in the RCDT case, a record of the comparison and the total count of speed negotiation data dwords is created and stored in capture memory 160 as illustrated by SNTT record 162. A timestamp generated by timestamp generator 170 is also affixed by trace formatting/compression engine 150 to the total count of speed negotiation data dwords and to the comparison and included in the SNTT record 162.

The RCDT record 161 and SNTT record 162 may then be accessible to a user of network diagnostic component 130 using an attached video display or like device. For example, if the measured D.C. idle count compares with the desired count, then RCDT record 161 will specify that a good RCDT was detected. On the other hand, if the measured D.C. idle count does not compare with the desired count, then RCDT record 161 will specify that a bad RCDT was detected or may simply specify this by the lack of an indication that a good RCDT was detected. In like manner, the SNTT record 162 will specify that a good SNTT was detected if the measured speed negotiation data dword count compare with the desired count. The SNTT record 162 will likewise not specify a good SNTT was detected if the measured and desired speed negotiation data dword counts do not match.

A specific example of an RCDT and SNTT decode process will now be at described with reference to Table 1.

TABLE 1

| Timestamp | Count | Decode |
|---|---|---|
| T1 | 37734 | D.C. idle |
| T2 | 1 | Good RCDT detected |
| T3 | 1500 | ALIGN0 |
| T4 | 6751 | ALIGN1 |
| T5 | 1 | Good SNTT detected |

During a SAS speed negotiation sequence, a SAS host transmits a data sequence 180 consisting first of D.C. idle and then speed negotiation data dwords. For example, if the SAS device, such as node 120, supports a particular speed, it typically transmits D.C. idle followed by ALIGN0 primitive data dwords to node 110 and then waits for an ALIGN0 data dword reply from node 110. When the ALIGN0 data dword reply is received, node 120 then transmits ALIGN1 primitive data dwords and likewise waits for a reply from node 110. The ALIGN0 and ALIGN1 data dword sequence make up the data portion of the speed negotiation sequence 180.

The data sequence 180 is received by state machine 140 as described above. The D.C. idle duration is counted by RCDT counter 190, which counts 37734 D.C. idles. This value is time stamped T1. This D.C. idle count is compared by compare engine 210 with a desired D.C. idle count. Since a Dword is approximately 13.3 nanoseconds long at 3 Gbps, the 37734 D.C. idle count approximately equals the desired 503 microseconds. A RCDT record is generated that is one dword in size and is time stamped T2. The RCDT record specifies that a good RCDT was detected.

The duration of the speed negotiation data dwords are counted by SNTT counter 200, which counts 1500 ALIGN0 dwords and 6751 ALIGN1 dwords for a total count of 8251 dwords. These count values are time stamped T3 and T4 respectively. This dword count is compared by compare engine 210 with the desired dword count. The 8251 dword count approximately equals the desired 110 microseconds. A SNTT record is generated that is one Dword in size and is time stamped T5. The SNTT record specifies that a good SNTT was detected.

Example Methods of RCDT and SNTT Capture

Figure 3:
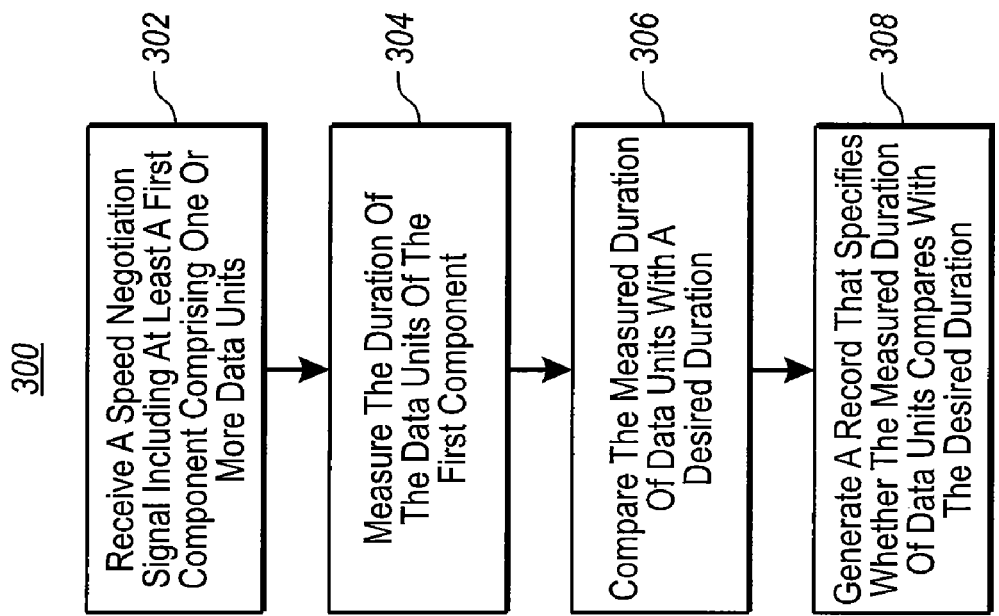
FIG. 3 illustrates a method for a network diagnostic component placed in-line between two nodes to capture the duration of a component of a speed negotiation signal.

Referring now to FIG. 3, a flowchart of a method 300 for an in-line diagnostic component to capture the duration of a component of a speed negotiation signal is illustrated. Method 300 will be described in relation to the network system of FIGS. 1 and 2, although this is not required. It will be appreciated that method 300 may be practiced in numerous diagnostic network systems. In some embodiments, method 300 may be performed on the fly in real time by the hardware components and modules of the network diagnostic component.

Method 300 includes an act of receiving a speed negotiation signal, wherein the speed negotiation signal includes at least a first component comprising one or more data units (act 302). For example, network diagnostic component 130, specifically speed negotiation state machine 140, may receive a speed negotiation data sequence 180 from either node 110 or node 120, which may be SAS devices. Speed negotiation data sequence 180 may include both D.C. idle and speed negotiation data dwords. The first signal component may be either the D.C. idle portion or the speed negotiation data portion. The received D.C. idles or dwords may be considered data units that comprise the first signal component.

Method 300 also includes an act of measuring the data units of the first component (act 304). For example, network diagnostic component 130, which may be a SAS device, may measure the duration of D.C. idle or the speed negotiation data dwords received from node 110 or 120. In some embodiments where the D.C. idles are the first signal component, the RCDT counter 190 may count (measure) the number D.C. idle Dwords. In other embodiments where the speed negotiation data dwords are the first signal component, the SNTT counter 200 may count (measure) the number of speed negotiation data dwords.

Method 300 further includes an act of comparing the measured duration of the data units with a desired duration (act 306). For example, diagnostic component 130 may compare the measured D.C. idle or speed negotiation data dwords with a desired duration. In those embodiments where the D.C. idles are the first signal component, compare module 210 may compare the total time of the D.C. idle dwords counted or measured by the RCDT counter 190 with the desired duration. In many embodiments, the desired duration for D.C. idles is 503 microseconds. In those embodiments where the speed negotiation data dwords are the first signal component, the compare module 210 may compare the total time of the data dwords counted or measured by the SNTT counter 200 with the desired duration. In many embodiments, this destined duration is 110 microseconds.

Method 300 additionally includes an act of generating a record that specifies whether the duration of the measured data units compare with the desired duration (act 308). For example, diagnostic component 130, specifically trace formatting/compression engine 150, may generate a record that is stored in capture memory 160. A RCDT record 161 may be generated for the comparison between the D.C. idles and the desired duration. Alternatively, a SNTT record 162 may be generated for the comparison between the speed negotiation data dwords and the desired duration. Both of the records may specify whether the measured duration of the D.C. idles and the data dwords compare with their desired durations.

In some embodiments, a timestamp generated by timestamp generator 170 may be affixed to the records 161 and 162. In still other embodiments, the RCDT record 161 or the SNTT record 162 may be displayed by a display device to inform a user of the comparison. The user may then take corrective action if necessary.

In further embodiments, diagnostic component 130 may first measure and compare the data units of the first signal component as described. The diagnostic component may then measure and compare data units of a second signal component as was described previously.

Example Network Diagnostic Functions

As mentioned above, the network diagnostic component 130 may perform a variety of network diagnostic functions. The network diagnostic component 130 may be configured to function as any combination of: a bit error rate tester, a protocol analyzer, a generator, a jammer, a monitor, and any other appropriate network diagnostic device.

Bit Error Rate Tester

In some embodiments, the network diagnostic component 130 may function as a bit error rate tester. The bit error rate tester may generate and/or transmit an initial version of a bit sequence via a communication path. If desired, the initial version of the bit sequence may be user selected. The bit error rate tester may also receive a received version of the bit sequence via a communication path.

The bit error rate tester compares the received version of the bit sequence (or at least a portion of the received version) with the initial version of the bit sequence (or at least a portion of the initial version). In performing this comparison, the bit error rate test may determine whether the received version of the bit sequence (or at least a portion of the received version) matches and/or does not match the initial version of the bit sequence (or at least a portion of the initial version). The bit error tester may thus determine any differences between the compared bit sequences and may generate statistics at least partially derived from those differences. Examples of such statistics may include, but are not limited to, the total number of errors (such as, bits that did not match or lost bits), a bit error rate, and the like.

It will be appreciated that a particular protocol specification may require a bit error rate to be less than a specific value. Thus, a manufacturer of physical communication components and connections (such as, optical cables), communication chips, and the like may use the bit error rate tester to determine whether their components comply with a protocol-specified bit error rate. Also, when communication components are deployed, the bit error tester may be used to identify defects in a deployed physical communication path, which then may be physically inspected.

Protocol Analyzer

In some embodiments, the network diagnostic component 130 may function as a protocol analyzer (or network analyzer), which may be used to capture data or a bit sequence for further analysis. The analysis of the captured data may, for example, diagnose data transmission faults, data transmission errors, performance errors (known generally as problem conditions), and/or other conditions.

As described below, the protocol analyzer may be configured to receive a bit sequence via one or more communication paths or channels. Typically, the bit sequence comprises one or more network messages, such as, packets, frames, or other protocol-adapted network messages. Preferably, the protocol analyzer may passively receive the network messages via passive network connections.

The protocol analyzer may be configured to compare the received bit sequence (or at least a portion thereof) with one or more bit sequences or patterns. Before performing this comparison, the protocol analyzer may optionally apply one or more bit masks to the received bit sequence. In performing this comparison, the protocol analyzer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence that comprises a network message having particular characteristics—such as, for example, having an unusual network address, having a code violation or character error, having an unusual timestamp, having an incorrect CRC value, indicating a link re-initialization, and/or having a variety of other characteristics.

The protocol analyzer may detect a network message having any specified characteristics, which specified characteristics may be user-selected via user input. It will be appreciated that a specified characteristic could be the presence of an attribute or the lack of an attribute. Also, it will be appreciated that the network analyzer may detect a network message having particular characteristics using any other suitable method.

In response to detecting a network message having a set of one or more characteristics, the network analyzer may execute a capture of a bit sequence—which bit sequence may comprise network messages and/or portions of network messages. For example, in one embodiment, when the network analyzer receives a new network message, the network analyzer may buffer, cache, or otherwise store a series of network messages in a circular buffer. Once the circular buffer is filled, the network analyzer may overwrite (or otherwise replace) the oldest network message in the buffer with the newly received network message or messages. When the network analyzer receives a new network message, the network analyzer may detect whether the network message has a set of one or more specified characteristics. In response to detecting that the received network message has the one or more specified characteristics, the network analyzer may execute a capture (1) by ceasing to overwrite the buffer (thus capturing one or more network messages prior to detected message), (2) by overwriting at least a portion or percentage of the buffer with one or more newly received messages (thus capturing at least one network message prior to the detected message and at least one network message after the detected message), or (3) by overwriting the entire buffer (thus capturing one or more network messages after the detected message). In one embodiment, a user may specify via user input a percentage of the buffer to store messages before the detected message, a percentage of the buffer to store messages after the detected message, or both. In one embodiment, a protocol analyzer may convert a captured bit stream into another format.

In response to detecting a network message having a set of one or more characteristics, a network analyzer may generate a trigger adapted to initiate a capture of a bit sequence. Also, in response to receive a trigger adapted to initiate a capture of a bit sequence, a network analyzer may execute a capture of a bit sequence. For example, the network analyzer may be configured to send and/or receive a trigger signal among a plurality of network analyzers. In response to detecting that a received network message has the one or more specified characteristics, a network analyzer may execute a capture and/or send a trigger signal to one or more network analyzers that are configured to execute a capture in response to receiving such a trigger signal. Further embodiments illustrating trigger signals and other capture systems are described in U.S. patent application Ser. No. 10/881,620 filed Jun. 30, 2004 and entitled PROPAGATION OF SIGNALS BETWEEN DEVICES FOR TRIGGERING CAPTURE OF NETWORK DATA, which is hereby incorporated by reference herein in its entirety It will be appreciated that a capture may be triggered in response to detecting any particular circumstance—whether matching a bit sequence and bit pattern, receiving an external trigger signal, detecting a state (such as, when a protocol analyzer's buffer is filled), detecting an event, detecting a multi-network-message event, detecting the absence of an event, detecting user input, or any other suitable circumstance.

The protocol analyzer may optionally be configured to filter network messages (for example, network messages having or lacking particular characteristics), such as, messages from a particular node, messages to a particular node, messages between or among a plurality of particular nodes, network messages of a particular format or type, messages having a particular type of error, and the like. Accordingly, using one or more bit masks, bit patterns, and the like, the protocol analyzer may be used identify network messages having particular characteristics and determine whether to store or to discard those network messages based at least in part upon those particular characteristics.

The protocol analyzer may optionally be configured to capture a portion of a network message. For example, the protocol analyzer may be configured to store at least a portion of a header portion of a network message, but discard at least a portion of a data payload. Thus, the protocol analyzer may be configured to capture and to discard any suitable portions of a network message.

It will be appreciated that a particular protocol specification may require network messages to have particular characteristics. Thus, a manufacturer of network nodes and the like may use the protocol analyzer to determine whether their goods comply with a protocol. Also, when nodes are deployed, the protocol analyzer may be used to identify defects in a deployed node or in other portions of a deployed network.

Generator

In some embodiments, the network diagnostic component 130 may function as a generator. The generator may generate and/or transmit a bit sequence via one or more communication paths or channels. Typically, the bit sequence comprises network messages, such as, packets, frames, or other protocol-adapted network messages. The network messages may comprise simulated network traffic between nodes on a network. In one embodiment, the bit sequence may be a predefined sequence of messages. Advantageously, a network administrator may evaluate how the nodes (and/or other nodes on the network) respond to the simulated network traffic. Thus, the network administrator may be able to identify performance deviations and take appropriate measures to help avoid future performance deviations.

In one embodiment, the generator may execute a script to generate the simulated network traffic. The script may allow the generator to dynamically simulate network traffic by functioning as a state machine or in any other suitable manner. For example, a script might include one or more elements like the following: "In state X, if network message A is received, transmit network message B and move to state Y." The generator may advantageously recognize network messages (and any characteristics thereof) in any other suitable manner, including but not limited to how a protocol analyzer may recognize network messages (and any characteristics thereof). The script may also include a time delay instructing the generator to wait an indicated amount of time after receiving a message before transmitting a message in response. In response to receiving a message, a generator may transmit a response message that is completely predefined. However, in response to receiving a message, a generator may transmit a response message that is not completely predefined, for example, a response message that includes some data or other portion of the received message.

Jammer

In some embodiments, the network diagnostic component 130 may function as a jammer. The jammer may receive, generate, and/or transmit one or more bit sequences via one or more communication paths or channels. Typically, the bit sequences comprise network messages (such as, packets, frames, or other protocol-adapted network messages) comprising network traffic between nodes on a network. The jammer may be configured as an inline component of the network such that the jammer may receive and retransmit (or otherwise forward) network messages.

Prior to retransmitting the received network messages, the jammer may selectively alter at least a portion of the network traffic, which alterations may introduce protocol errors or other types of errors.

By altering at least a portion of the network traffic, the jammer may generate traffic, which traffic may be used to test a network. For example, a network administrator may then evaluate how the nodes on the network respond to these errors. For example, a network system designer can perform any one of a number of different diagnostic tests to make determinations such as whether a system responded appropriately to incomplete, misplaced, or missing tasks or sequences; how misdirected or confusing frames are treated; and/or how misplaced ordered sets are treated. In some embodiments, the network diagnostic component 130 may include any suitable jamming (or other network diagnostic system or method) disclosed in U.S. Pat. No. 6,268,808 B1 to Iryami et al., entitled HIGH SPEED DATA MODIFICATION SYSTEM AND METHOD, which is hereby incorporated by reference herein in its entirety.

In one embodiment, to determine which network messages to alter, the jammer may be configured to compare a received bit sequence—such as a network message—(or a portion of the received bit sequence) with one or more bit sequences or patterns. Before performing this comparison, the jammer may optionally apply one or more bit masks to the received bit sequence. In performing this comparison, the jammer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a message to a particular node, a network message between or among a plurality of particular nodes, a network message of a particular format or type, and the like. Accordingly, the jammer may be configured to detect a network message having any specified characteristics. Upon detection of the network message having the specified characteristics, the jammer may alter the network message and/or one or more network messages following the network message.

Monitor

In some embodiments, the network diagnostic component 130 may function as a monitor, which may be used to derive statistics from one or more network messages having particular characteristics, one or more conversations having particular characteristics, and the like.

As described below, the monitor may be configured to receive a bit sequence via one or more communication paths or channels. Typically, the monitor passively receives the network messages via one or more passive network connections.

To determine the network messages and/or the conversations from which statistics should be derived, the monitor may be configured to compare a received a bit sequence—such as a network message—(or a portion of the received bit sequence) with one or more bit sequences or patterns. Before performing this comparison, the monitor may optionally apply one or more bit masks to the received bit sequence. In performing this comparison, the monitor may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a network message to a particular node, a network message between or among a plurality of particular nodes, a network message of a particular format or type, a network message having a particular error, and the like. Accordingly, the monitor may be configured to detect a network message having any specified characteristics—including but not limited to whether the network message is associated with a particular conversation among nodes.

Upon detecting a network message having specified characteristics, the monitor may create and update table entries to maintain statistics for individual network messages and/or for conversations comprising packets between nodes. For example, a monitor may count the number of physical errors (such as, bit transmission errors, CRC error, and the like), protocol errors (such as, timeouts, missing network messages, retries, out of orders), other error conditions, protocol events (such as, an abort, a buffer-is-full message), and the like. Also, as an example, the monitor may create conversation-specific statistics, such as, the number of packets exchanged in a conversation, the response times associated with the packets exchanged in a conversation, transaction latency, block transfer size, transfer completion status, aggregate throughput, and the like. It will be appreciated that a specified characteristic could be the presence of an attribute or the lack of an attribute.

In some embodiments, the network diagnostic component 130 may include any features and/or perform any method described in U.S. patent application Ser. No. 10/769,202, entitled MULTI-PURPOSE NETWORK DIAGNOSTIC MODULES and filed on Jan. 30, 2004, which is hereby incorporated by reference herein in its entirety Example Systems It will be appreciated that the network diagnostic component 130 may be used to implement a variety of systems.

In one embodiment, the network diagnostic component 130 may comprise a printed circuit board. The printed circuit board may include a CPU module.

In one embodiment, the network diagnostic component 130 may comprise a blade. The blade may include a printed circuit board, an interface, or any combination thereof.

In one embodiment, the network diagnostic component 130 may comprise a chassis computing system. The chassis computing system may include one or more CPU modules, which may be adapted to interface with one, two, or more blades or other printed circuit boards. For example, a blade may have an interface though which a diagnostic module may send network diagnostic data to a CPU module of the chassis computing system. The chassis computer system may be adapted to receive one or more printed circuit boards or blades.

A CPU module may transmit the network diagnostic data it receives to a local storage device, a remote storage device, or any other suitable system for retrieval and/or further analysis of the diagnostic data. A client software program may retrieve, access, and/or manipulate the diagnostic data for any suitable purpose. Examples of systems and methods for storing and retrieving network diagnostic data include, but are not limited to, those described in U.S. patent application Ser. No. 10/307,272, entitled A SYSTEM AND METHOD FOR NETWORK TRAFFIC AND I/O TRANSACTION MONITORING OF A HIGH SPEED COMMUNICATIONS NETWORK and filed Nov. 27, 2002, which is hereby incorporated by reference herein in its entirety.

In one embodiment, the network diagnostic component 130 may comprise an appliance. Depending on the particular configuration, the appliance may include any suitable combination of one or more CPU modules and one or more diagnostic modules. In one embodiment, an appliance may include and/or be in communication with one or more storage devices, which may advantageously be used for storing any suitable diagnostic data, statistics, and the like. In one embodiment, an appliance may include and/or be in communication with one or more client interface modules, which may advantageously be used for displaying information to a user, receiving user input from a client software program, sending information to a client software program, or both. The appliance may also include and/or be in communication with one or more display devices (such as, a monitor) adapted to display information, one or more user input devices (such as, a keyboard, a mouse, a touch screen, and the like) adapted to receive user input, or both.

It will be appreciated that the network diagnostic component 130 may comprise any of a variety of other suitable network diagnostic components.

Example Operating and Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for one or more hardware modules of a network diagnostic component that is placed in-line between first and second nodes in a network to compare in real time the duration of a portion of a speed negotiation signal with a desired duration, the method comprising:

an act of receiving a speed negotiation signal from the first node for communication with the second node during a speed negotiation window, wherein the speed negotiation signal includes a first component comprising one or more data units and a second component comprising one or more common voltage units;

an act of detecting the one or more data units of the first component and the one or more common mode voltage units of the second component;

an act of generating aligned data representing the detected one or more data units of the first component and the detected one or more common mode voltage units of the second component, while routing the speed negotiation signal to the second node, the aligned data being such that the one or more data units can be measured without also having to measure the one or more common mode voltage units and the one or more common mode voltage units can be measured without also having to measure the one or more data units;

an act of measuring the duration of the one or more data units of the generated aligned data;

an act of comparing the measured duration of the one or more data units with a desired duration; and an act of generating a record that specifies whether the measured duration of the one or more data units compare with the desired duration.

2. The method in accordance with claim 1, further comprising:

an act of affixing a timestamp to the generated record.

3. The method in accordance with claim 2, further comprising:

an act of displaying the generated record on a display device.

4. The method in accordance with claim 1, wherein the network diagnostic component is a Serial Attached Small Computer System Interface ("SAS") network diagnostic component that supports the SAS protocol.

5. The method in accordance with claim 1, further comprising:

an act of measuring the duration of the one or more common mode voltage units of the generated aligned data, an act of comparing the measured duration of the one or more common mode voltage units of the second component with a second desired duration; and an act of generating a record that specifies whether the measured duration of the one or more common mode voltage units compare with the second desired duration.

6. The method in accordance with claim 1, wherein the second component is a D.C. idle.

7. The method in accordance with claim 1, wherein the first component is speed negotiation data.

8. The method in accordance with claim 1, wherein the speed negotiation signal is of the Serial Attached Small Computer System Interface ("SAS") protocol.

9. The method in accordance with claim 1, wherein the act of measuring the duration of the data units comprises:

an act of counting the data units with a counter; and an act of calculating the total time of the counted data units based on a known time value.

10. A network diagnostic device placed in-line between first and second nodes in a network comprising:

a first module configured to receive a speed negotiation signal from the first node, during a speed negotiation window, for communication with the second node, wherein the speed negotiation signal includes a first component comprising one or more data units and a second component comprising one or more common voltage units;

the first module configured to detect the one or more data units of the first component and the one or more common mode voltage units of the second component;

the first module configured to generate aligned data representing the detected one or more data units of the first component and the detected one or more common mode voltage units of the second component, while routing the speed negotiation signal to the second node, the aligned data being aligned such that the one or more data units can be measured without also having to measure the one or more common mode voltage units and the one or more common mode voltage units can be measure without also having to measure the one or more data units;

a second module configured to measure the duration of the one or more common mode voltage units of the generated aligned data;

a third module configured to compare the measured duration of the one or more common mode voltage units with a desired duration;

a fourth module configured to generate a record that specifies whether the measured duration of the one or more common mode voltage units compare with the desired duration; and one or more processors for interfacing with the first, second, third and fourth modules;

wherein the first, second, third and fourth modules comprise at least one of computer hardware and computer software; and wherein the computer hardware is one or more devices selected from the group consisting of a field programmable gate array ("FPGA"), a field programmable logic array ("FPLAs"), a programmable logic array ("PLAs"), any programmable logic device, and application-specific integrated circuits ("ASICs").

11. The network diagnostic device in accordance with claim 10, further comprising:

a fifth module that is configured to generate a timestamp and affix the timestamp to the generated record;

wherein the fifth module comprises at least one of computer hardware and computer software; and wherein the computer hardware is one or more devices selected from the group consisting of a field programmable gate array ("FPGA"), a field programmable logic array ("FPLAs"), a programmable logic array ("PLAs"), any programmable logic device, and application-specific integrated circuits ("ASICs").

12. The network diagnostic device in accordance with claim 10, wherein the first module is a speed negotiation state machine.

13. The network diagnostic device in accordance with claim 10, wherein the second module is a Speed Negotiation Transmit Time ("SNTT") counter.

14. The network diagnostic device in accordance with claim 10, wherein the network diagnostic device is a Serial Attached Small Computer System Interface ("SAS") network diagnostic component that supports the SAS protocol.

15. The network diagnostic device in accordance with claim 10, wherein the first component is one of speed negotiation data or D.C. idle.

16. The network diagnostic device in accordance with claim 10, wherein the network diagnostic device is one of a bit error rate tester, a protocol analyzer, a generator, a jammer, and a monitor.

17. The network diagnostic device in accordance with claim 10, further comprising:

a fifth module configured to measure the duration of the one or more data units of the generated aligned data; and wherein the third module is further configured to compare the measured duration of the one or more data units of the generated aligned data with a second desired duration and wherein the fourth module is further configured to generate a record that specifies whether the measured duration of the one or more data units of the generated aligned data compare with the second desired duration; and wherein the fifth module comprises at least one of computer hardware and computer software; and wherein the computer hardware is one or more devices selected from the group consisting of a field programmable gate array ("FPGA"), a field programmable logic array ("FPLAs"), a programmable logic array ("PLAs"), any programmable logic device, and application-specific integrated circuits ("ASICs").

18. The network diagnostic device in accordance with claim 17, wherein the fifth module is a Rate Change Delay Time ("RCDT") counter.

19. The network diagnostic device in accordance with claim 10, wherein the second component is a D.C. idle.

20. A diagnostic network comprising:

a first Serial Attached Small Computer System Interface ("SAS") node;

a second SAS node;

a SAS diagnostic device placed in-line between the first and second SAS nodes comprising:

a first module configured to receive a speed negotiation signal, during a speed negotiation window, wherein the speed negotiation signal includes a first component comprising one or more data units and a second component comprising one or more common mode voltage units;

the first module configured to detect the one or more data units of the first component and the one or more common mode voltage units of the second component;

the first module configured to generate aligned data representing the detected one or more data units of the first component and the detected one or more common mode voltage units of the second component, while routing the speed negotiation signal to the second SAS node, the aligned data being aligned such that the one or more data units can be measured without also having to measure the one or more common mode voltage units and the one or more common mode voltage units can be measured without also having to measure the one or more data units;

a second module configured to determine the duration of the one or more data units of the generated aligned data;

a third module configured to compare the duration of the one or more data units with a desired duration; and a fourth module configured to generate a record that specifies whether the duration of the one or more data units compares with the desired duration; and one or more processors for interfacing with the first, second, third and fourth modules;

wherein the first, second, third and fourth modules comprise at least one of computer hardware and computer software; and wherein the computer hardware is one or more devices selected from the group consisting of a field programmable gate array ("FPGA"), a field programmable logic array ("FPLAs"), a programmable logic array ("PLAs"), any programmable logic device, and application-specific integrated circuits ("ASICs").

21. The diagnostic network in accordance with claim 20, wherein the first component is speed negotiation data.

* * * * *